United States Patent [19]
Matysek

[11] 3,829,987
[45] Aug. 20, 1974

[54] TEACHING MACHINE

[76] Inventor: John J. Matysek, c/o Remote Controls Corporation, P.O. Box 5566, Charlottesville, Va. 22903

[22] Filed: Dec. 9, 1971

[21] Appl. No.: 206,460

[52] U.S. Cl. .................................. 35/9 A, 35/48 R
[51] Int. Cl. ............................................. G09b 7/02
[58] Field of Search........ 35/5, 6, 8 R, 8 A, 9 R, 9 A, 35/9 B, 9 C, 9 E, 35 R, 35 C, 48 R; 40/28.3; 353/73

[56] References Cited
UNITED STATES PATENTS

| | | | |
|---|---|---|---|
| 2,742,815 | 4/1956 | Dietrich et al. | 353/73 X |
| 3,220,126 | 11/1965 | Gabrielsen | 40/28.3 |
| 3,300,875 | 1/1967 | Nisbet | 35/9 B |
| 3,363,330 | 1/1968 | Kobler | 35/9 C |
| 3,497,966 | 3/1970 | Gaven | 35/9 A |
| 3,501,851 | 3/1970 | Price, Jr. | 35/9 A |
| 3,570,146 | 3/1971 | Golden | 35/48 R |
| 3,666,872 | 5/1972 | Powell et al. | 35/9 A |

Primary Examiner—Robert W. Michell
Assistant Examiner—Vance Y. Hum
Attorney, Agent, or Firm—Morton, Bernard, Brown, Roberts & Sutherland

[57] ABSTRACT

Apparatus permitting the presentation of audio-visual material, including questions, to a student and capable of responding in an appropriate manner to an answer selected by the student. A video message or lesson segment is displayed to the student, and, after a preset time delay, an indication is provided that he should select an answer to a question included in the lesson segment. The student selects his answers, for example by positioning a magnetic stylus adjacent one of a plurality of magnetic reed switches. In a lesson mode of operation, if the student has selected the right answer, an appropriate indication is given and the video display advances to the next lesson segment to repeat the cycle, but if the student has selected a wrong answer, an audio message segment is provided to the student emphasizing material from which the correct answer can be found. The student is then given another opportunity to answer the question. If he then selects the correct answer, the video display advances to the next lesson segment as before. If, however, he selects another wrong answer, no change is made, and after the preset time delay, he is instructed to select another answer. In a test mode of operation, there is no audio output, and the video display advances after every answer selected by the student. Variations on these features can be provided. A cabinet is included having a display screen onto the front of which the video display is projected so that it is visible to the student without having to pass through the screen.

22 Claims, 9 Drawing Figures

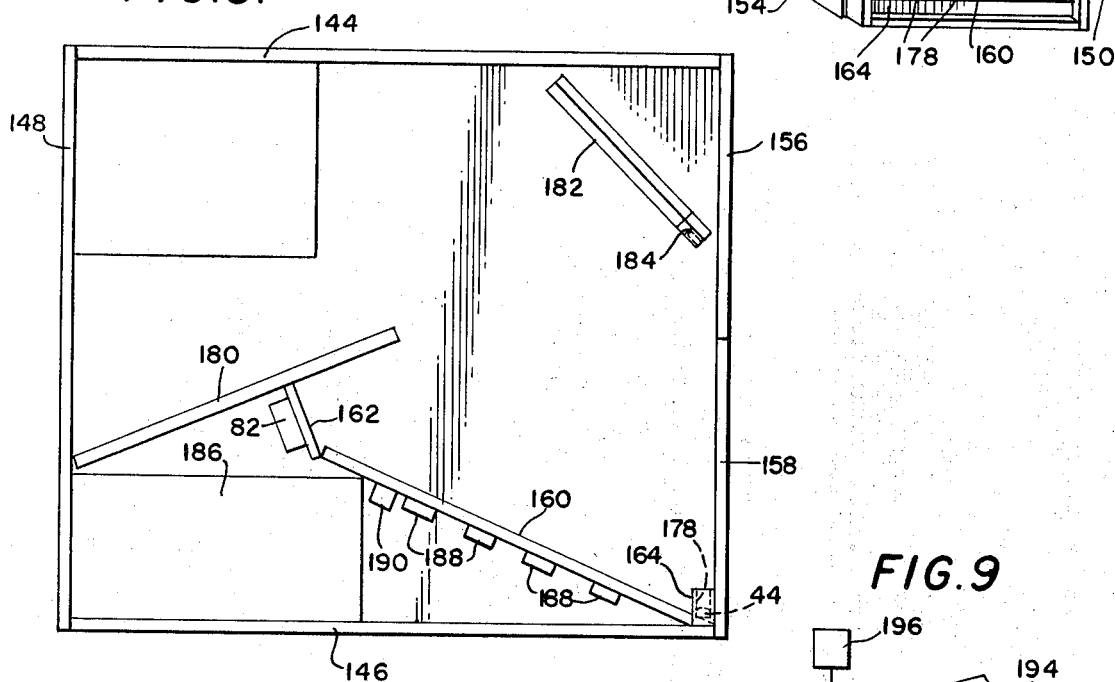

TEACHING MACHINE

The present invention pertains to a teaching machine. More particularly, the present invention pertains to an electronic tutor for providing audio-visual presentations of material and including the capability of presenting review and test questions to the user and responding in an appropriate manner to answers given by the user to the questions.

Teaching machines capable of presenting pre-programmed audio-visual material are utilized in numerous situations. Not only are such machines frequently used in formal education programs, such as in language classes, but also they find use in special teaching situations. By way of example, new employees can be trained in the operating methods of a business by such machines, and existing employees can be re-trained in revised operating methods or given refresher training as needed. Use of pre-programmed teaching materials in such situations eliminates need for specially trained local instructors and insures against varying interpretations of instructional material. All students or employee-trainees receive the same instructional material, increasing the probability of uniform interpretation. Additionally, with such a machine, existing employees can be examined on their knowledge and skills as one step in employee evaluation for purposes of advancement or merit pay increases.

Many presently available teaching machines are constructed of electromehcanical components such as relays and stepping switches. These components generate noise when they operate, both audible noise and radio frequency interference which disturbs educational television and other electronic equipment in classrooms or nearby. While the noise generated by a single such teaching machine is relatively small, when a room full of such machines is in use by a large number of students, considerable noise is generated, distracting from the teaching process. Presently available teaching machines also generally include a video portion that projects images onto the rear of a display screen, with the images visible through the screen to the user. Such rear projection is undesirable since much of the light is lost during passage through the display screen.

The audio portion of lessons utilized in existing teaching machines is generally recorded in some manner such as on a film strip or on a magnetic tape. Such audio lessons usually include questions at intervals, following which it is desirable for the audio portion to stop until the student has provided an answer. In presently available teaching machines this is generally accomplished by coding the tape in some manner so that it will stop at the end of each question. In some machines, this coding is done by attaching a piece of conducting foil to the tape. However, if the tape is subsequently to be reused with another lesson, this foil must be removed. Removal of the foil is extremely laborious and time-consuming, and the tape is frequently damaged during such removal. In other systems, a two-track tape is utilized, with the lesson and questions on one track and with control signals on the second track. With a two-track tape, it is generally required that the lesson and questions be recorded on one track following which the tape is played back so that the control signals can be recorded on the second track. During this playback, the recorded lesson and questions must be carefully monitored to recognize cues indicating the points at which control signals are to be inserted. This, too, is a time-consuming and laborious process.

The present invention is a teaching machine overcoming these several difficulties which have been experienced with existing teaching machines. The teaching machine of the present invention is substantially entirely solid state, thus eliminating noise from electromechanical components. In the teaching machine of the present invention, the video display is projected onto the front of the viewing screen, thereby eliminating the degrading of the video display which would occur due to passage of the display through the display screen. In addition, the display screen is positioned at an angle, making it comfortable for use by the viewer. The lesson and questions utilized in the teaching machine of the present invention are recorded on a magnetic tape. The apparatus of the present invention includes appropriate timing circuitry to provide intervals for these audio messages, following which the machine automatically stops the lesson until the student provides an answer to a question that has been presented. Thus, command signals are unnecessary. Consequently, a single track tape can be utilized without having to place supervisory code indications on it. The end of the lesson segment is indicated by a tone of relatively high frequency recorded on the tape following the message, and thus the lesson and this end of segment signal are recordable on the single track of the tape.

In accordance with the present invention, a recorded audio message can include instructions, lessons, and questions pertaining to a video portion which is simultaneously projected on the viewing screen. In addition, light is projected onto one of a plurality of photodetectors to indicate a correct answer to a question presented to the user. The student is initially presented with only the video portion and a question which is to be answered. The student indicates his selected answer by positioning a magnetic stylus at a corresponding answer space which is adjacent one of a plurality of magnetic switches. If the answer selected by the student is the correct answer, this selection of the right answer is indicated by the apparatus, and the machine automatically moves on to the next portion of the lesson. If a wrong answer is selected, an appropriate indication is made, and the audio message is provided to the student, following which he is provided the chance to make another answer selection. If the student then selects the right answer, the machine progresses to the next lesson portion, as before, but if he again selects a wrong answer, the machine so indicates and waits for him to select the right answer.

These and other aspects and advantages of the present invention are more apparent in the following detailed description of an operational embodiment of the present invention and the appended claims, particularly when considered in conjunction with the accompanying drawings in which like parts bear like reference numerals. In the drawings:

FIGS. 5 and 6 illustrate a manner of enabling the teaching machine to respond appropriately to selection by the student of a right answer or of a wrong answer to a question presented him by the teaching machine; and FIGS. 7, 8 and 9 illustrate embodiments of enclosures suitable for housing a teaching machine in accordance with the present invention.

Figure 1:
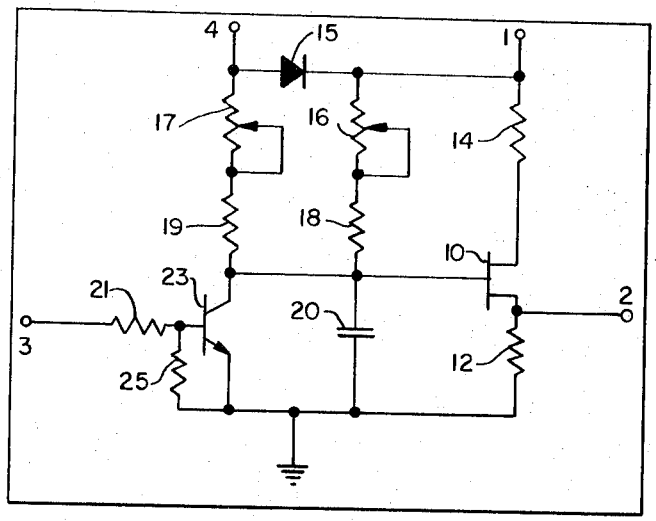
FIGS. 1, 2 and 3 depict schematic diagrams of components suitable for use in a teaching machine in accordance with the present invention.

FIG. 1 depicts a unijunction transistor timing circuit suitable for use in the teaching machine of the present invention. Unijunction transistor 10 has its base 1 coupled through resistor 12 to ground and its base 2 coupled through resistor 14 to terminal 1 of the timing circuit. Base 1 of unijunction transistor 10 is also tied to terminal 2 of the timing circuit. Terminal 1 of the timing circuit is coupled through the series combination of variable resistor 16 and fixed resistor 18 to the emitter of unijunction transistor 10. Capacitor 20 couples the emitter of unijunction transistor 10 to ground. Terminal 3 of the timing circuit is coupled through resistor 21 to the base of NPN transistor 23, which has its emitter tied to ground and its collector tied to the emitter of unijunction transistor 10. Resistor 25 couples the base of transistor 23 to ground. Terminal 4 of the timing circuit is tied to the anode of diode 15, the cathode of which is connected to terminal 1. Terminal 4 is also coupled through the series combination of variable resistor 17 and fixed resistor 19 to the emitter of unijunction transistor 10.

If a voltage is applied to terminal 1 of the timing circuit, the voltage is applied through resistors 16 and 18 to capacitor 20 on which it builds up until unijunction transistor 10 conducts or fires. A pulse is then provided to terminal 2 of the timing circuit. The length of time required for unijunction transistor 10 to fire with voltage from terminal 1 is determined by the adjustment of variable resistor 16. If a voltage is applied to terminal 4 of the timing circuit, or to both terminal 1 and terminal 4, the voltage is applied through resistors 17 and 19 and through diode 15 and resistors 16 and 18 to capacitor 20 on which it builds up until unijunction transistor 10 fires to apply a pulse to terminal 2 of the timing circuit. The length of time required for unijunction transistor 10 to fire with voltage from terminal 4 or from terminals 1 and 4 is thus determined by the adjustment of variable resistors 16 and 17 and will be less than with voltage from only terminal 1, since voltage builds up faster through the parallel combination of resistors. If a voltage is applied to terminal 3 of the timing circuit, then transistor 23 turns on, coupling the emitter of unijunction transistor 10 to ground, and so unijunction transistor 10 is prevented from firing.

Figure 4:
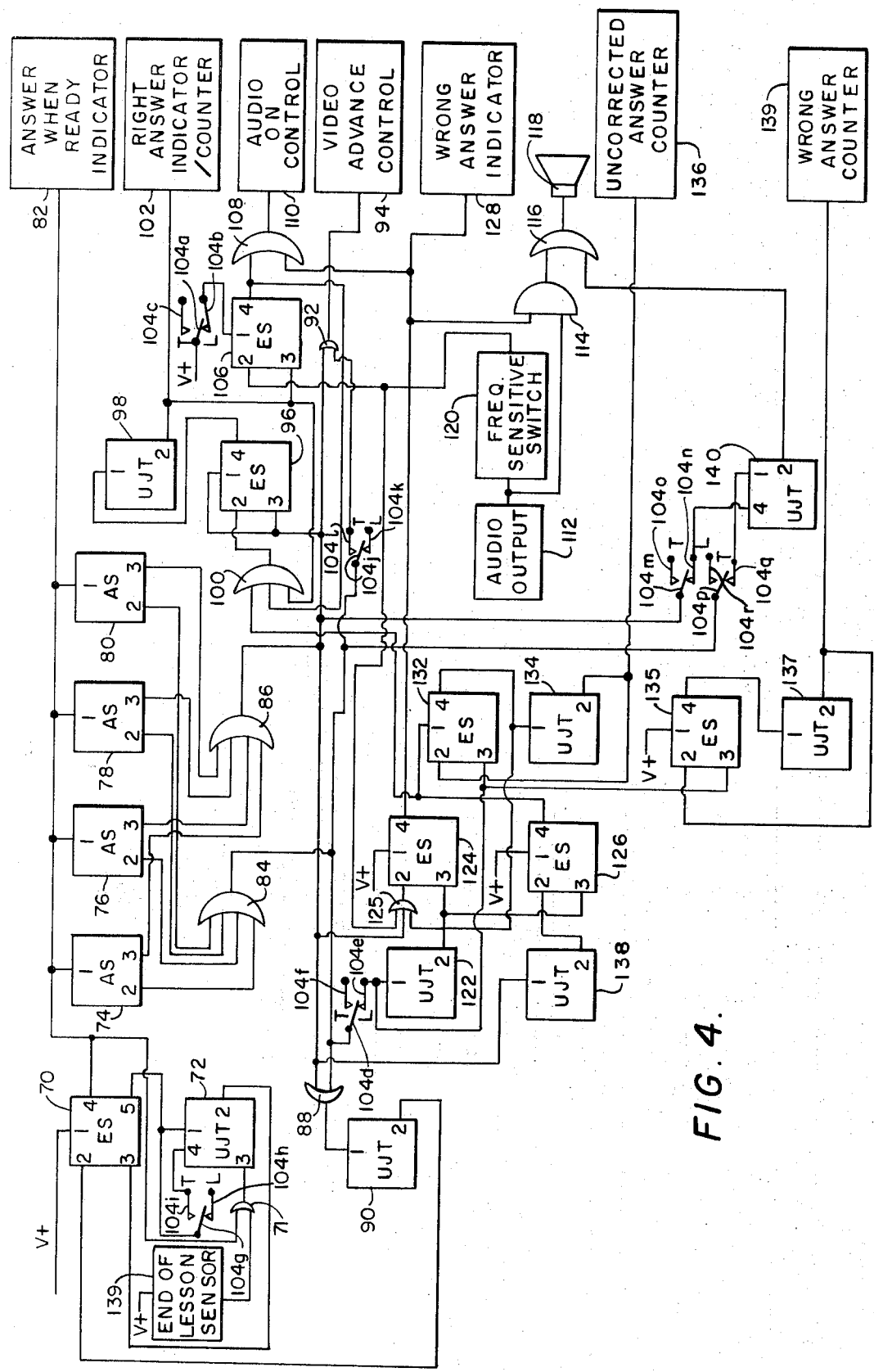
FIG. 4 is a block diagram illustrating a teaching machine in accordance with the present invention.

The block diagram of the teaching machine depicted in FIG. 4 includes several unijunction transistor timing circuits of the type illustrated in FIG. 1. Each of these is labeled "UJT" in FIG. 4. Not every one of them utilizes all four timing circuit terminals, however, and only the terminals actually utilized are shown in FIG. 4.

Figure 2:
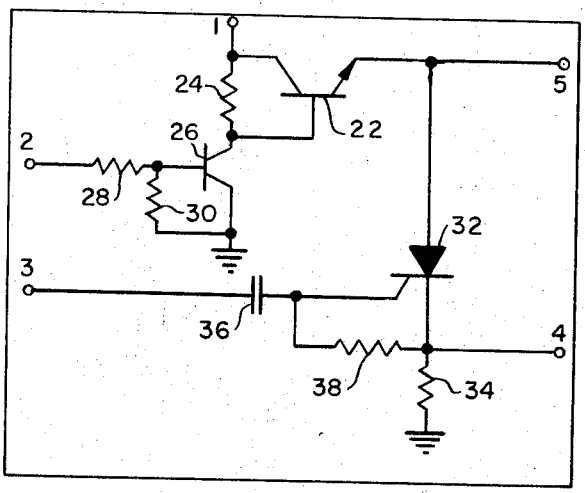

FIG. 2 depicts a switching circuit suitable for use in the teaching machine of FIG. 4. Terminal 1 of the switching circuit is tied to the collector of NPN transistor 22, the emitter of which is tied to terminal 5 of the switching circuit. The collector of transistor 22 is coupled to its base by resistor 24. The base of transistor 22 is also tied to the collector of NPN transistor 26 which has its emitter tied to ground. The base of transistor 26 is coupled by resistor 28 to terminal 2 of the switching circuit and is coupled by resistor 30 to ground. The emitter of transistor 22 is tied to the anode of silicon controlled rectifier (SCR) 32, the cathode of which is connected to terminal 4 of the switching circuit and is coupled through resistor 34 to ground. The gate of SCR 32 is coupled by capacitor 36 to terminal 3 of the switching circuit and is coupled by resistor 38 to the cathode of the SCR.

If there is no signal applied to terminal 2 of the switching circuit, transistor 26 is cut off. If voltage is then applied to terminal 1 of the switching circuit, transistor 22 conducts and provides voltage to terminal 5 of the switching circuit and to the anode of SCR 32. If a positive voltage is then applied to terminal 3 of the switching circuit, SCR 32 turns on and provides voltage to the switching circuit terminal 4. If a positive voltage is applied to terminal 2 of the switching circuit, transistor 26 turns on, cutting off transistor 22 and blocking voltage from terminal 5 of the switching circuit and from the anode of SCR 32. Voltage can then no longer be provided at terminal 4 of the switching circuit.

The switching circuit of FIG. 2 is thus an electronic switch and several such circuits are utilized in the teaching machine depicted in FIG. 4. Each of these electronic switches in FIG. 4 is designated "ES" and has its terminals numbered in accordance with FIG. 2, although not every terminal is utilized on every electronic switch and only those terminals which are utilized are labeled.

Figure 3:
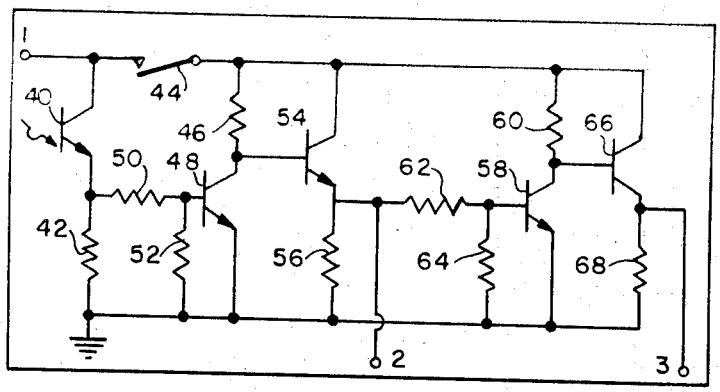

FIG. 3 illustrates a circuit by means of which a student can indicate his answers to questions included in the audio-visual material and by means of which a signal is generated to indicate whether the student has selected the right answer or the wrong answer. Light-sensitive transistor 40 has its collector tied to terminal 1 of the answer circuit and its emitter coupled through resistor 42 to ground. Terminal 1 of the answer circuit is also connected to one contact of magnetic reed switch 44, the second contact of which is coupled through resistor 46 to the collector of NPN transistor 48. The base of transistor 48 is coupled through resistor 50 to the emitter of transistor 40 and is coupled through resistor 52 to the emitter of transistor 48 and to ground. NPN transistor 54 has its collector tied to the second terminal of mangetic reed switch 44, its base tied to the collector of transistor 48, and its emitter coupled through resistor 56 to ground. The emitter of transistor 54 is also tied to terminal 2 of the answer circuit. NPN transistor 58 has its collector coupled through resistor 60 to the second terminal of magnetic reed switch 44, its emitter tied to ground and its base coupled through resistor 62 to the emitter of transistor 54 and coupled through resistor 64 to ground. NPN transistor 66 has its collector tied to the second terminal of magnetic reed switch 44, its base tied to the collector of transistor 58, and its emitter coupled through resistor 68 to ground. The emitter of transistor 66 is also tied to terminal 3 of the answer circuit.

If light shines upon light-sensitive transistor 40, indicating that the answer associated with the answer circuit of which transistor 40 is a part is the correct answer to the question presented to the student, then transistor 40 assumes a conducting state. If, a the same time, voltage is available to terminal 1 of the answer circuit, that voltage is applied through transistor 40 and resistor 50 to the base of transistor 48. The student indicates his selected answer by positioning a magnetic stylus adjacent the contacts of the magnetic reed switch 44 in the answer circuit associated with his selected answer. This causes contacts 44 to close, making voltage available at the second contact of the magnetic reed switch 44. Therefore, if the student selects the correct answer, transistor 40 conducts and switch 44 closes. This turns on transistor 48, cutting off transistors 54 and 58. Consequently, transistor 66 turns on, applying voltage to terminal 3 of the answer circuit to indicate that the student has selected the correct answer, that is, that there is correspondence between the answer selected by the student and the correct answer as indicated by the activated light-sensitive transistor 40. If the student selects a wrong answer by positioning his magnetic stylus adjacent the magnetic reed switch 44 of an answer circuit which does not have light shining on its light-sensitive transistor 40, then transistor 48 does not turn on, and so transistors 54 and 58 turn on. This cuts off transistor 66, blocking voltage from terminal 3 of the answer circuit. Since transistor 54 is turned on, voltage is available at terminal 2 of the answer circuit to indicate that the student has selected an incorrect answer and that there is no correspondence between the answer selected by the student and the correct answer as indicated by the activated light-sensitive transistor 40.

In the teaching machine depicted in FIG. 4, several answer circuits of the type illustrated in FIG. 3 are utilized to permit the student to indicate his selected answers. In FIG. 4, these answer selection circuits are designated "AS," and the terminals are designated as in FIG. 3.

FIG. 4 is a logic diagram of illustrative circuitry implementing a desired working program and suitable for the teaching machine of the present invention. Electronic switch (ES) 70 has its terminal 1 connected to a suitable source of voltage and its terminal 5 connected to terminal 1 of UJT circuit (UJT) 72. Consequently, if there is no input at terminal 2 of ES 70, voltage is applied through ES 70 to terminal 1 of UJT 72. UJT 72 is adjusted to provide an output pulse at its terminal 2 after a time sufficient for playback of one segment of the audio portion of the lesson and for the student to cover the audio-visual material in one segment of a lesson, for example a time in the order of 65 seconds. This output pulse is applied to terminal 3 of ES 70 and results in voltage then being available at terminal 4 of ES 70. That voltage is applied through OR gate 71 to terminal 3 of UJT 72, preventing UJT 72 from generating any further pulses.

The voltage from terminal 4 of ES 70 is also applied to terminal 1 of each answer selection circuit. FIG. 4 illustratively depicts four answer selection circuits 74, 76, 78, and 80, but any desired number could be provided. The voltage from terminal 4 of ES 70 is also applied to indicator 82 which is energized to indicate to the student that he should select an answer to the question presented by the teaching machine.

Each answer selection circuit 74–80 has its terminal 2 connected as an input to OR gate 84 which, therefore, provides an output whenever the student has selected a wrong answer. Likewise, each answer selection circuit 74–80 has its terminal 3 connected as an input to OR gate 86 which provides an output whenever the student has selected a right answer. OR gates 84 and 86 have their outputs connected as input to OR gate 88, the output of which is connected to terminal 1 of UJT 90. Terminal 2 of UJT 90 is connected to terminal 2 of ES 70. Thus, once the student selects an answer, UJT 90 is activated, and after its preset time, for example 200 milliseconds, a pulse is applied to ES 70 to turn it off, terminating the output from OR gate 84 or 86. Once the pulse from UJT 90 ends, the cycle of ES 70 and UJT 72 begins again with ES 70 turning on to apply voltage from terminal 5 of ES 70 to terminal 1 of UJT 72. In this manner, the circuit is enabled for the next lesson segment.

If the student has selected the correct answer, the signal from OR gate 86 is applied through OR gate 92 to video advance control 94 to advance the video display. In addition, this correct answer indication from OR gate 86 is applied to terminals 1 and 3 of ES 96 which, therefore, applies voltage from its terminal 4 to terminal 1 of UJT 98. After the time delay for which UJT 98 is set, for example 145 milliseconds, an output signal is applied from its terminal 2 through OR gate 100 to terminal 2 of ES 96, deactivating the electronic switch. The output from terminal 2 of UJT 98 is also applied to indicator/counter 102 which indicates to the student that he has selected a right answer and which counts the number of right answers selected by the student. Indicator/counter 102 might include an audio frequency signal generator to provide to the student an audio indication that he has selected the right answer, or it might include a visual indicator which preferably has circuitry causing the visual right answer indication to remain for a brief period of time, for example a time in the order of five seconds, or both.

A multiple-pole-double-throw switch 104 is provided to determine whether the teaching machine is in its Lesson mode, in which each answer is followed by a time delay sufficient to permit the student to cover a lesson segment before enabling him to select another answer, or in its Test mode, in which only a brief time delay is required between each answer. Moving contact 104a of switch 104 is connected to a suitable source of voltage. Fixed contact 104b, associated with the Lesson mode of operation, is connected to terminal 1 of electronic switch 106. There is no connection to fixed contact 104c, associated with the Test mode of operation. If the student is receiving a lesson from the teaching machine, then switch 104 is positioned with its moving contact 104a closed against fixed contact 104b to provide voltage to terminal 1 of ES 106. If, instead, the student is taking a test on the teaching machine, then switch 104 is positioned with its moving contact 104a closed against its second fixed contact 104c, and so ES 106 receives no power. Terminal 2 of UJT 98 is connected to terminal 3 of ES 106, and so in the Lesson mode of operation, the output pulse from UJT 98 turns on ES 106. The output signal from terminal 4 of ES 106 passes through OR gate 108 to audio on control 110 which, for example, might be a control to turn on a tape recorder having an audio lesson thereon. The output from terminal 4 of ES 106 is also applied through OR gate 100 to terminal 2 of ES 96 to maintain that electronic switch in its cutoff condition.

Audio control 110 then turns on the audio lesson to apply an audio lesson segment from audio output unit 112 to one input of AND gate 114, the output of which is coupled through OR gate 116 to loudspeaker 118, which might be a pair of earphones or a conventional loudspeaker. When the student selects a correct answer, AND gate 114 does not receive a signal at its second input, and so the audio output from unit 112 is blocked at AND gate 114.

At the end of the audio lesson segment, audio output unit 112 provides an end-of-segment signal. By way of illustration, this might be a brief pulse of tone at a frequency slightly above the frequency range normally generated by human voice, for example, a frequency in the order of 2,000 hertz to 4,000 hertz. The audio output from unit 112 is also applied to frequency sensitive switch 120 which is responsive to the frequency of the end-of-segment command signal recorded at the end of each lesson segment. When the lesson segment ends, that command signal activates switch 120 to apply an input to terminal 2 of ES 106, cutting off that electronic switch, terminating the audio on condition, and removing the inhibiting input from terminal 2 of ES 96.

During the time the student is considering the video display of the next segment, and the audio segment is being provided by audio output unit 112, but is blocked from the loudspeaker 118 by AND gate 114, UJT 72, which is energized by each answer, is timing its interval. Once this is completed, UJT 72 again applies a pulse to ES 70 causing voltage to be provided from terminal 4 of ES 70 to the answer selection circuits 74 through 80 and to indicator 82 to indicate to the student that he should select an answer. Thus, the audio message might be of any duration up to the timing interval of UJT 72, and this timing interval can be varied to suit the desired maximum audio message length. The system is then in condition to recieve the student's answer to the question in the next lesson segment.

The output of OR gate 84 is connected to moving contact 104d of switch 104. Fixed contact 104e, associated with the Lesson mode of operation, is connected to terminal 1 of UJT 122, while fixed contact 104f, associated with the Test mode, has no connection. Should the student select a wrong answer in the Lesson mode, the wrong answer signal from OR gate 84 is applied to terminal 1 of UJT 122 which, after a delay, for example in the order of 145 milliseconds, applies a pulse from its terminal 2 to terminal 3 of ES 124 and to terminal 3 of ES 126. ES 124 and 126 each have their terminal 1 connected to a suitable source of voltage, and so each generates a signal on its terminal 4 in response to the pulse from UJT 122. Terminal 4 of ES 124 is coupled through OR gate 108 to audio on control 110 to activate the audio lesson. Terminal 4 of ES 124 is also connected to the second input of AND gate 114. The audio lesson from audio output unit 112, therefore, passes through gates 114 and 116 to loudspeaker 118. Gates 114 and 116 are depicted in logic form in FIG. 4 but, of course, must be capable of passing the audio signal from output unit 112.

The output of frequency sensitive switch 120 is coupled through OR gate 125 to terminal 2 of ES 124 to deactivate that electronic switch at the end of the audio lesson segment and prior to the student selecting another answer. The audio lesson from unit 112 includes material to emphasize to the student the idea from which the correct answer to a question can be found and is provided to the student only in the Lesson mode and after the student has selected a wrong answer to a question. After receiving this audio material, the student is given another chance to answer the same question. If he then selects the correct answer, the lesson advances to the next segment without any audio material being provided to the student, appearing to the student the same as if the student had initially selected the right answer. If, instead, the student then selects another wrong answer, the lesson is not advanced, but the audio material is not repeated.

The output from terminal 4 of ES 126 passes through OR gate 100 to terminal 2 of ES 96, preventing that electronic switch from being activated so that a right answer following a wrong answer is not indicated or counted by indicator/counter 102. Terminal 4 of ES 124 is also connected to indicator 128 to indicate to the student that he has selected a wrong answer. Indicator 128 may provide a brief audible indication or a visible indication or both.

ES 132 has its terminal 1 connected to terminal 4 of ES 126 and its terminal 3 connected to fixed switch contact 104e. Thus, upon generation of a wrong answer in the Lesson mode, voltage is applied to terminal 3 of ES 132. However, voltage is not available to terminal 1 of ES 132 until the delay introduced by UJT 122, for example 145 milliseconds, has passed following the initiation of the wrong answer signal from OR gate 84. The capacitor 36 which couples terminal 3 of ES 132 to the gate of the SCR 32 within that electronic switch results in only the leading edge of the wrong answer signal from OR gate 84 influencing the SCR 32. Therefore, even though the wrong answer signal has a duration of 200 milliseconds, the first wrong answer signal generated does not turn on Es 132; it only makes voltage available to terminal 1 of that electronic switch. Should the student then select a second wrong answer, that wrong answer signal from OR gate 84 immediately turns on ES 132 to indicate that the student has failed to correct his wrong answer. This uncorrected answer signal from terminal 4 of ES 132 passes through OR gate 125 to terminal 2 of electronic switch 124. Consequently, the output from UJT 122, which occurs at 145 milliseconds after the generation of the second or subsequent wrong answer signal at OR gate 84, does not activate ES 124, and so only the first wrong answer turns on the audio portion of the lesson.

The uncorrected answer output from terminal 4 of ES 132 is applied to terminal 1 of UJT 134. After a delay in the order of 300 milliseconds, UJT 134 applies from its terminal 2 a pulse to terminal 2 of ES 132 to reset that electronic switch. The uncorrected answer pulse from UJT 134 is also applied to counter 136 which counts the number of wrong answers which the student has selected beyond the first wrong answer to any question. This permits evaluation of the effectiveness of the audio lesson segment from audio output device 112 in providing the student the material from which he can correct a previous wrong answer.

When, following one or more wrong answers, the student selects the right answer, the signal from OR gate 86 passes through OR gate 92 to video advance control 94, advancing the video program to the next segment. That signal from OR gate 86 also passes through OR gate 88 to UJT 90 which cuts off ES 70. In addition, the signal from OR gate 86 passes through OR gate 125 to terminal 2 of ES 124 to insure that that electronic switch is deactivated. Since the terminal 4 output of ES 126 is passed through OR gate 100 to terminal 2 of ES 96, this right answer does not activate ES 96, and consequently, that right answer is not indicated or counted by indicator/counter 102 and does not advance the audio portion of the lesson. Terminal 1 of UJT 138 is tied to the output of OR gate 86. Thus, the right answer signal is applied to UJT 138 which, after a delay, for example in the order of 180 milliseconds, applies a pulse to terminal 2 of ES 126, resetting that electronic switch. It is thus seen that selection of one wrong answer causes the teaching machine to provide an audio message through speaker 118 to the student, following which he is instructed to select another answer. If he selects another wrong answer, the teaching machine so indicates and counts that subsequent wrong answer, but the machine does not provide an additional audio message. When the student at last selects a correct answer, the teaching machine advances to the next video segment to continue the lesson.

If the student is to take a test on the teaching machine, then switch 104 is changed from its Lesson position to its Test position. Consequently, contact 104a is closed against contact 104c, and so ES 106 cannot be activated. Likewise, contact 104d is closed against contact 104f. UJT 122, and so ES 124, ES 126, ES 132, and UJT 134 can not be activated. As a result, in the test mode, audio on control 110 is never activated, and so the audio portion of the lesson is not provided. Additionally, no wrong answers are counted in the Test mode.

The terminal 5 output of ES 70 is connected to moving contact 104g of switch 104. There is no connection to fixed contact 104h, associated with the Lesson mode of operation. Fixed contact 104i, associated with the Test mode, is tied to terminal 4 of UJT 72. Thus, in this Test mode UJT 72 receives power to its terminal 1 and its terminal 4. Consequently, capacitor 20 within UJT 72 charges to the firing voltage of unijunction transistor 10 rapidly, for example in a time in the order of 5 seconds. Thus, the student need wait only this shorter period of time between questions in the Test mode. If desired, in implementing the circuitry, greater latitude can be obtained in the range of time available from the UJT circuits by removing the coupling of terminal 4 through diode 15 to terminal 1 and by connecting terminal 1 of UJT 72 to fixed contact 104h, rather than to terminal 5 of ES 70.

Moving contact 104j of switch 104 is connected to the output of OR gate 84. Fixed contact 104k, associated with the Lesson mode of operation, has no connection. Fixed contact 104l, associated with the Test mode, is coupled through OR gate 92 to video advance control 94. Thus, in the Test mode, whether the student selects a right answer or a wrong answer, video advance control 94 is actuated. In implementing the circuitry of FIG. 4, one set of contacts of switch 104 can be eliminated, if desired, by connecting fixed contact 104f to OR gate 92 and eliminating contacts 104j, 104k and 104l.

At the end of each full lesson or test, end-of-lesson sensor 139 applies a signal through OR gate 71 to terminal 3 of UJT 72, preventing generation of any more pulses by that UJT until the complete circuit is reset. As one example of apparatus appropriate for end-of-lesson sensor 139, a photodetector can be provided upon which light shines following completion of the last segment of the video message, or in the event of a slide sticking as it moves into the projector, to apply voltage to OR gate 71, thereby stopping operation of the circuitry. By this means, the teaching machine is held in an inactive state following the lesson or test. Suitable switching is provided to reset the necessary circuitry, including the audio and video displays.

Numerous variations can be made in the circuitry of the teaching machine to fit particular desires. By way of example, if desired, the right answer signal from OR gate 86 can be connected to moving contact 104m of switch 104 and the wrong answer signal from OR gate 84 connected to moving contact 104p. Fixed contact 104n, associated with the Lesson mode, is connected to terminal 4 of UJT 140, while fixed contact 104q, also associated with the Lesson mode, is connected to terminal 1 of UJT 140. There are no connections to fixed contacts 104o and 104r, each associated with the Test mode. Terminal 2 of UJT 140 is coupled through OR gate 116 to loudspeaker 118. Thus, in the Lesson mode, if a student selects a right answer, voltage is applied to terminal 4 of UJT 140, causing pulses at the faster rate of this UJT, the rate being within the audio frequency range to give a pleasant sound from loudspeaker 118. If, on the other hand, the student selects a wrong answer in the Lesson mode, voltage is applied to terminal 1 of UJT 140 to give pulses at a lower audio frequency rate, causing a lower, unpleasant sound from loudspeaker 118.

As another variation, the circuitry can be caused to count the number of right answers and the number of wrong answers given by the student. One way this might be done is to connect terminal 1 of ES 132 directly to a suitable source of voltage rather than to terminal 4 of ES 126. As a consequence, in the Lesson mode, each wrong answer turns on ES 132 to trigger UJT 134 and apply a pulse to wrong answer counter 136. If desired to provide selection of capabilities, terminal 1 of ES 132 can be connected to the moving contact of a single-pole-double-throw switch which has one fixed contact connected to terminal 4 of ES 126 to permit counting of uncorrected wrong answers and its other fixed contact connected to a voltage source to permit counting of every wrong answer.

Additionally, if desired, the teaching machine can be provided with the capability of counting both total wrong answers and repetitive or uncorrected wrong answers. This would permit more thorough evaulation of the effectiveness of the teaching material. To accomplish this, ES 135 is provided with its terminal 1 connected to a suitable source of voltage, its terminal 3 connected to fixed contact 104e, and its terminal 4 connected to terminal 1 of UJT 137. Terminal 2 of UJT 137 is connected to terminal 2 of ES 135 and to wrong answer counter 139. At the first wrong answer to a question, ES 132 is not acivated, but ES 135 is activated to apply voltage to UJT 137. After a delay in the order of 300 milliseconds, UJT 137 applies a pulse to counter 139 and to terminal 2 of ES 135. This first wrong answer is thus counted by counter 139, but not by counter 136, which therefore is an uncorrected answer counter. If the student selects subsequent wrong answers to the same question, both ES 132 and ES 135 are activated, and so both counter 136 and counter 139 count these wrong answers.

The circuitry of FIGS. 1, 2 and 3 operates from a positive source of voltage. By suitable modification it could, of course, be made to operate from a negative voltage source.

If desired, the teaching machine can present to the student both a new video lesson segment and a new audio lesson segment following each right answer, rather than using the audio lesson segment as a review device following selection of a wrong answer. This might be done, for example, by connecting the output of audio output unit 112 directly to OR gate 116, eliminating AND gate 114, and by actuating audio on control 110 with the output of OR gate 92, eliminating ES 106 and OR gate 108.

The use of magnetic stylus 179, depicted in FIG. 7, and the magnetic reed switches 44, depicted in FIG. 3, is but one manner in which the student can indicate the answer selected by him to questions presented by the audio-visual lesson or test. In place of these, there might be utilized manually actuated switches, key actuated switches, or any other suitable switches.

FIGS. 1-3 illustrate circuitry suitable for particular components within the overall circuit of FIG. 4. Other circuitry could, of course, be used for these components. Thus, integrated circuits, tube circuits, or relay circuits could be utilized in place of the circuits of FIGS. 1-3 so long as the required operation is obtained.

FIGS. 5 and 6 illustrate a manner of actuating the photodetector in the answer selection circuit associated with the correct answer. This photodetector is represented by light-sensitive transistor 40 in FIG. 3. Film segment 166, in FIG. 5, includes video display area 168 having along one of its edges a thin strip 170 that is blacked out. A plurality of code locations 172 is provided in strip 170. The code location 172 associated with the correct answer is transparent to allow light to pass therethrough onto the associated light-sensitive transistor 40. By this means, the correct answer coding can be placed in film segment 166 as a part of the art work on video display area 168, and so the coding is accomplished as the film segments are produced. Film segment 166 might be a slide, mounted within a suitable frame of, for example, light cardboard, or it might be a segment of a film strip or of a movie film. If a slide is used, code locations 172 could be locations in its frame for holes to permit passage of light, rather than being a portion of video display area 168.

FIG. 6 is a plan view illustrating a projector 174 projecting the video display of film segment 166 onto surface 176. Light from projector 174 also passes through one of the code locations 172 to shine on photodetector 40, adjacent surface 176. The number of code locations 172 and photodetectors 40 provided is equal to the number of answer selection circuits within the teaching machine so that the photodetector 40 which receives light indicates the correct answer to the question included in the video display area 168 of film segment 166.

FIGS. 7 and 8 illustrate a cabinet suitable for housing the electronic teaching machine of the present invention and providing a display screen upon the front of which the video portion of the lesson can be projected so that it is visible to the student without having to pass through the display screen. Cabinet 142 includes top 144, bottom 146, rear 148, first side 150, panel 152 covering the front portion of the side opposite first side 150, and door 154 hingedly connected to panel 152 to cover the remainder of that side when closed. When door 154 is open, as depcited in FIG. 7, access can be obtained to the equipment within cabinet 142. In addition, cabinet 142 includes panel 156 which is fixedly attached to the upper portion of the front of cabinet 142. Panel 158 is provided to cover the lower portion of the cabinet front and is removable so that an opaque display screen 160 within cabinet 142 may be viewed.

If desired, suitable mounting attachments can be provided on the rear of cabinet 142 to hold panel 158 when it is removed from the cabinet front. Indicators 82, 102, 128 and 136 are mounted on support surface 162 at the rear of display screen 160 for ready viewing by the student as he watches display screen 160. Mounting bar 164, of a nonmagnetic material such as wood or aluminum, is positioned along the lower front edge of cabinet 142, and thus along the front edge of display screen 160. Mounting bar 164 has a plurality of openings 178 extending thereinto. At the bottom of each opening 178 is positioned the magnetic reed switch 44 from one of the answer selection circuits 74-80 of FIG. 4. Thus, to indicate his selected answer, the student places a magnetic stylus 179 slightly into the opening 178 associated with his selected answer to close the magnetic reed switch 44 of the associated answer selection circuit. Since the student must place the tip of magnetic stylus 179 slightly into the opening 178, he can not rapidly sweep it across all of the magnetic reed switches to actuate more than one magnetic reed switch.

FIG. 8 is a side elevational view of cabinet 142 with panel 152 and door 154 removed. Shelf 180 is positioned within cabinet 142 to hold a video display device such as a video projector. As illustrated in FIG. 8, shelf 180 is in the rear portion of the cabinet 142 and is inclined from rear to front so that the video display device projects somewhat upwardly. By way of example, shelf 180 might be inclined at an angle in the order of 22-½°. Mirror 182 is positioned in the front upper corner of cabinet 142 so that it is at an angle in the order of 45° from the vertical. The reflective side of mirror 182 is toward shelf 180. Photodetectors 40 are mounted on support 184 adjacent mirror 182. Display screen 160 is positioned in the front portion of cabinet 142 and is inclined from front to rear, for example at an angle in the order of 22-½°. The electronic circuitry of FIG. 4 can be situated at any convenient location within cabinet 142, for example on circuit board 186. Preferably suitable openings are provided in the various surfaces of cabinet 142 to permit air circulation and venting.

With a projector on shelf 180 to project images toward mirror 182, these images are reflected to opaque display screen 160 upon which they are displayed. With panel 158 removed from the front of cabinet 142, these images are readily visible by a student, and the inclination of display screen 160 places the image at a comfortable viewing angle. Support surface 162 preferably extends substantially perpendicular to shelf 180, and so indicators 82, 102, 128 and 136 are positioned for easy viewing by the student so that he will not have to move his head to see these indicators as he is watching display screen 160.

Preferably, display screen 160 is a material which results in a clear image of the video display while being easy on the eyes of the viewer. By way of example, display screen 160 might be an aluminum plate having its display surface painted with a soft green, semi-gloss paint. With door 154 closed, the interior of cabinet 142 is relatively dark, and so the image appears in an easy-to-read manner. If a slide projector is utilized as the projection device on shelf 180, the inclination of shaft 180 is such that the image is directed in the desired manner and yet slides are readily set into the projector by gravity.

The cabinet of FIGS. 7 and 8 is, of course, but one manner in which the teaching machine can be enclosed. The significant feature is the provision of display screen 160 in a manner which permits front projection of images onto it. Thus, if desired, display screen 160, support surface 162, mounting bar 164, shelf 180, mirror 182, support 184, and circuit board 186, together with all the circuitry, can be provided in a frame of, for example, aluminum, positioned as depicted in FIG. 8. Such a frame, with the components therein, could be readily slid into an available cabinet or enclosure rack.

Since screen 160 is rigid, it can be used as a support surface for paper on which the student draws images projected onto it. Thus, the student can make copies of graphs, schematices, or other drawings.

If viewing screen 160 is a non-magnetic material, such as wood or aluminum, a number of magnetic sensors 188 can be positioned beneath it. Then, a video segment can be provided, including material on which the student is to indicate his answer to a question using a magnetic stylus. Magnetic sensors 188 will detect the student's answer. The question might be a multiple-choice question, requiring selection of the correct one of a plurality of possible answers, in which event, magnetic sensors 188 might replace magnetic reed switches 44, or the question might require the student to trace a particular graph or other curve, in which event the student must actuate the correct sensors in the correct sequence. In addition, timer 190 can be included to determine the student's response time, permitting evaluation of improvements in response time, either in answering objective questions or in tracing curves. The teaching machine is also ideally suited for teaching reading improvement courses and for training in comprehension of spoken messages. To teach speed reading, a page of text can be projected onto viewing screen 160 and each line of text illuminated in sequence. Spoken messages can be provided through audio output device 112. In either event, questions can then be presented to determine comprehension.

If desired, rather than presenting video material by means of a projector on shelf 180 to project images onto viewing surface 160, the video display can be in the form of pages making up a "book." FIG. 9 depicts a video display book 192, including a plurality of pages 194 and having a mechanism 196 to turn the pages in response to the actuation of video advance control 94. Magnetic sensors can be positioned within pages 194, if desired, to permit selection of answers to questions or drawing of curves.

Although the present invention has been described with reference to preferred embodiments, numerous modifications could be made, and still the result would be within the scope of the invention. The apparatus could be utilized for applications other than a teaching machine. Thus, for example, the apparatus could respond to selection of a correct answer by performing a specified function such as unlocking a door. Likewise, the apparatus could respond to an incorrect answer by performing a specified function such as supplying appropriate alert signals. By way of example, erroneous instructions by an air traffic controller could be detected and withheld by the apparatus until corrective measures were taken.

What is claimed is:

1. Apparatus for presenting audio-visual material including questions to a student and resonding to an answer selected by the student, said apparatus comprising:
   video display means for providing a segment of video message material;
   audio display means for providing a segment of audio message material;
   a first plurality of answer selection means;
   correct answer indicating means for indicating one of the answer selection means;
   answering means for enabling a student to select one of a plurality of answers, each answer corresponding to a unique one of the answer selection means;
   enabling signal means for providing an enabling signal;
   disabling means connected to the enabling signal means and responsive to selection by a student of an answer at the answering means for disabling the enabling signal means to inhibit the enabling signal for a preset time following selection by a student of an answer at the answering means;
   video advance means for advancing the video display means to provide a new segment of video-display material;
   audio advance means for advancing the audio display means to provide a new segment of audio display material;
   right answer signaling means responsive to the simultaneous presence of an enabling signal from the enabling signal means and selection by a student of an answer corresponding with the answer selection means selected by the correct answer indication means for generating a right answer signal;
   wrong answer signaling means responsive to the simultaneous presence of an enabling signal from the enabling signal means and selection by a student of an answer corresponding with an answer selection means other than the answer selection means selected by the correct answer indication means for generating a wrong answer signal;
   first control means coupled to the right answer signaling means, the video advance means and the audio advance means; said first control means responsive to generation of a right answer signal for activating the video advance means to advance the video display means; said first control means responsive to generation of a right answer signal immediately subsequent to a previous right answer signal for activating the audio advance means, to advance the audio display means;
   second control means coupled to the wrong answer signaling means and the audio advance means; said second control means responsive to generation of a wrong answer signal immediately subsequent to a previous right answer signal for activating the audio advance means to advance the audio display means;
   audio output means;
   third control means coupling the audio display means to the audio output means and responsive to actuation of the second control means for applying the segment of audio message material from the audio display means as an audible output signal from the audio output means; and manual switch means coupled to the first control means, the second control means and the audio advance means; said manual switch means capable of assuming a first position in which, in response to generation of a right answer signal immediately subsequent to a previous right answer signal the first control means activates the audio advance means and in which, in response to generation of a wrong answer signal immediately subsequent to a previous right answer signal, the second control means activates the audio advance means; the manual switch means capable of assuming a second position in which the first and second control means are inhibited from activating the audio advance means and in which, in response to generation of a wrong answer signal, the second control means activates the video advance means.

2. Apparatus as claimed in claim 1 in which the first plurality of answer selection means comprises a first plurality of photodetectors and in which the correct answer indication means comprises a light source and means for directing light from the light source onto a selected one of the first plurality of photodetectors.

3. Apparatus as claimed in claim 1 in which the answering means comprises a first plurality of magnetically actuated switches and a magnet capable of placement adjacent a selected one of the magnetically actuated switches.

4. Apparatus as claimed in claim 1 in which the video display means comprises a plurality of filmed video display material segments, a viewing screen, and projection means for projecting images of the filmed video display material segments onto the viewing screen.

5. Apparatus as claimed in claim 4 in which the correct answer indication means comprises a light source, means on at least some of the filmed video display material segments defining a first plurality of code positions, and means for controlling passage of light through the code positions and in which the first plurality of answer selection means comprises a first plurality of photodetectors, each photodetector mounted to receive light from the light source after passage through a uniquely associated one of the code positions.

6. Apparatus as claimed in claim 4 in which the plurality of filmed video display material segments comprise a plurality of slides and in which the projection means comprises a slide projector.

7. Apparatus as claimed in claim 4 in which the plurality of filmed video display material segments comprise a film strip and in which the projection means comprises a film strip projector.

8. Apparatus as claimed in claim 4 in which the plurality of filmed video display material segments comprise a movie film and in which the projection means comprises a movie projector.

9. A teaching machine as claimed in claim 1 further comprising:
  right answer indicator means for providing a right answer indication in response to the simultaneous presence of an enabling signal from the enabling signal means and selection by a student of an answer corresponding with the answer selection means selected by the correct answer indication means; and
  wrong answer indicator means for providing a wrong answer indication in response to the simultaneous presence of an enabling signal from the enabling signal means and selection by a student of an answer corresponding with an answer selection means other than the answer selection means selected by the correct answer indication means.

10. Apparatus as claimed in claim 9 further comprising means connected to the right answer indicator means and to the wrong answer indicator means for generating an uncorrected answer indication in response to each wrong answer indication subsequent to the first wrong answer indication following generation of a right answer indication and until generation of another right answer indication.

11. Apparatus as claimed in claim 1 further comprising audio signal generating means for generating a first audio signal in response to the simultaneous presence of a timing signal from the first timing means and selection by a student of an answer corresponding with the answer selection means selected by the correct answer indication means and a second audio signal in response to the simultaneous presence of a timing signal from the first timing means and selection by a student of an answer corresponding with an answer selection means other than the answer selection means selected by the correct answer indication means.

12. Apparatus as claimed in claim 1 further comprising timing means for timing the interval between initiation of the enabling signal by the enabling signal means and selection of an answer by a student.

13. Apparatus as claimed in claim 22 further comprising:
  a support frame having a front and a back;
  an opaque viewing screen having a front surface and a back surface, the viewing screen mounted within the support frame with the viewing screen front surface facing the support frame front;
  a support shelf within the support frame for supporting the video display means to project a video image of video message material segments onto the viewing screen front surface with the video image viewable from the support frame front; and
  means for mounting the audio display means, the answer selection means, the correct answer indicating means, the answering means, the enabling means, the disabling means, the video advance means, the audio advancing means, the right answer signaling means, the wrong answer signaling means, the first control means, the second control means, the audio output means, the third control means, and the manual switch means within the support frame.

14. Apparatus as claimed in claim 13 further comprising enclosure means for enclosing the support frame, the enclosure means including an openable panel over at least a portion of the support frame front for opening of the portion to permit viewing of the viewing screen front surface.

15. Apparatus as claimed in claim 13 in which the video display means comprises a plurality of filmed video display material segments, and projection means for projecting images of the filmed video display material segments onto the viewing screen.

16. Apparatus as claimed in claim 15 in which the correct answer indicating means comprises a light source, means on at least some of the filmed video display material segments defining a first plurality of code positions, and means for controlling passage of light through the code positions, and in which said first plurality of answer selection means comprises a first plurality of photodetectors, each photodetector mounted to receive light from the light source after passage through an uniquely associated one of the code positions.

17. Apparatus as claimed in claim 15 in which the plurality of filmed video display material segments comprise a plurality of slides and in which the projection means comprises a slide projector.

18. Apparatus as claimed in claim 15 in which the plurality of filmed video display material segments comprise a film strip and in which the projection means comprises a film strip projector.

19. Apparatus as claimed in claim 15 in which the plurality of filmed video display material segments comprise a movie film and in which the projection means comprises a movie projector.

20. Apparatus as claimed in claim 13 in which the video display means comprises a book mounted on the viewing screen and having a plurality of pages of video message material segments, and in which the video advance means includes actuation means responsive to activation by the first control means for turning pages of the book.

21. Apparatus as claimed in claim 13 in which the control means includes timing means for measuring the time required for a student to select an answer at the answering means.

22. Apparatus as claimed in claim 1 in which the answering means comprises a first plurality of switches.

* * * * *